United States Patent [19]
Jenness

[11] 3,917,365
[45] Nov. 4, 1975

[54] PIVOTED BEARING PAD WITH CIRCUMFERENTIALLY ADJUSTABLE PIVOT POINT AND METHODS OF CIRCUMFERENTIALLY ADJUSTING SAID PIVOT POINT

[75] Inventor: Raymond C. Jenness, Milwaukee, Wis.

[73] Assignee: Allis-Chalmers Corporation, Milwaukee, Wis.

[22] Filed: May 28, 1974

[21] Appl. No.: 473,811

[52] U.S. Cl. ............................... 308/73; 308/122
[51] Int. Cl.² ........................................ F16C 17/06
[58] Field of Search ............. 308/135, 1 R, 2 R, 73, 308/116, 122, 72

[56] References Cited
UNITED STATES PATENTS

| | | | |
|---|---|---|---|
| 3,351,394 | 11/1967 | Hooker | 308/122 X |
| 3,604,767 | 9/1971 | Decker | 308/73 |
| 3,622,213 | 11/1971 | Onsrud | 308/122 |
| 3,703,322 | 11/1971 | Gustafsson | 308/122 |

*Primary Examiner*—Lloyd L. King
*Assistant Examiner*—Michael Mar
*Attorney, Agent, or Firm*—Robert C. Sullivan

[57] ABSTRACT

A journal bearing of the pivoted pad type in which the bearing pad includes: (1) a bearing pad portion having an interface A with the rotating journal and (2) a pivotal support portion having at its radially inner end an interface B with the bearing pad portion, and a radially outer surface which is adapted to pivot on a stationary supporting surface.

Oil inlets are provided at both of the interfaces A and B whereby a high pressure hydraulic flow may be introduced at one or both interfaces to radially space the various surfaces at the interfaces in a "jacking up" action. This facilitates circumferential movement of the bearing pad portion and of the pivotal support portion relative to each other to effect shifting of the pivot point of the bearing pad to an optimum location for a given direction of journal rotation. When the pivot point has been shifted to the desired optimum position, the bearing pad portion and the pivotal support portion are secured together in fixed position relative to each other.

14 Claims, 2 Drawing Figures

PIVOTED BEARING PAD WITH CIRCUMFERENTIALLY ADJUSTABLE PIVOT POINT AND METHODS OF CIRCUMFERENTIALLY ADJUSTING SAID PIVOT POINT

BACKGROUND OF THE INVENTION

1. Field of the Invention

This invention relates to journal bearings, and more particularly to a journal bearing of the pivoted pad type which is adapted for bidirectional rotation of the journal which is supported for rotation, and to an apparatus for and method of circumferentially adjusting the location of the pivot point of the pivoted bearing pad for optimum operation in either direction of rotation.

2. Description of the Prior Art

It has been known in the prior art to provide an offset pivot for a pivoted bearing pad since the use of an offset pivot is known to facilitate the formation of the hydrodynamic lubricating oil film wedge between the bearing surface and the rotating journal. When using an offset pivot for a pivoted bearing pad, the pivot point of the bearing pad is set a greater distance away from the "leading" edge of the pivoted bearing pad than from the "trailing" edge of the bearing pad. This facilitates formation of the hydrodynamic lubricating oil film wedge in the region of the leading edge. The leading edge of the pivoted bearing pad is defined as that edge of the bearing pad first reached by a given point P on the periphery of the rotating journal for a given direction of rotation of the journal. If the direction of rotation of the journal is reversed, the relative position of the leading edge and trailing edge of the pivoted bearing pad is reversed.

In using an offset pivot for a pivoted bearing pad when it is desired to change the direction of rotation of the journal member which is journalled for rotation in the bearing, it is necessary to mechanically shift the pivot point of the pivoted bearing pad to provide the optimum location of the pivot for the particular direction of rotation in which it is desired to rotate the journal; that is, if it is desired to change the direction of rotation of the journal from, for example, clockwise rotation to counterclockwise rotation, it is necessary to mechanically shift the pivot point of the pivoted bearing pad in order to optimize the offset location of the pivot point for the new direction of rotation.

STATEMENT OF THE INVENTION

Accordingly, it is an object of the invention to provide an improved pivoted bearing pad construction and apparatus which facilitates the adjustment of the pivot point of the bearing pad to permit bidirectional rotation of the journal supported by the pivoted pad journal bearing.

It is a further object of the invention to provide improved methods for adjusting the location of the pivot point of a pivoted bearing pad to permit bidirectional rotation of the journal supported by the pivoted pad journal bearing.

It is a further object of the invention to provide an improved pivoted bearing pad apparatus and method which permits adjustment of the location of the bearing pad pivot point for bidirectional rotation of the apparatus journalled for rotation, and in which the adjustment can be made while the apparatus (such as a large rotary grinding mill, for example,) is loaded.

In achievement of these objectives, there is provided in accordance with an embodiment of the invention a journal bearing of the pivoted pad type in which the bearing pad includes (1) a bearing pad portion having an interface A with the rotating journal and (2) a pivotal support portion having at its radially inner end an interface B with the bearing pad portion, and a radially outer surface which is adapted to pivot on a stationary supporting surface.

Oil inlet means are provided at both of the interfaces A and B whereby a high pressure hydraulic flow may be introduced at one or both interfaces to radially space the various surfaces at the interfaces in a jacking up action. This facilitates circumferential movement of the bearing pad portion and of the pivotal support relative to each other to effect shifting of the pivot point of the bearing pad to an optimum location for a given direction of rotation. When the pivot point has been shifted to the desired optimum position, the bearing pad portion and the pivotal support portion are secured together in fixed position relative to each other.

Further objects and advantages of the invention will become apparent from the following description taken in conjunction with the accompanying drawings in which:

DESCRIPTION OF PREFERRED EMBODIMENT

Figure 1:
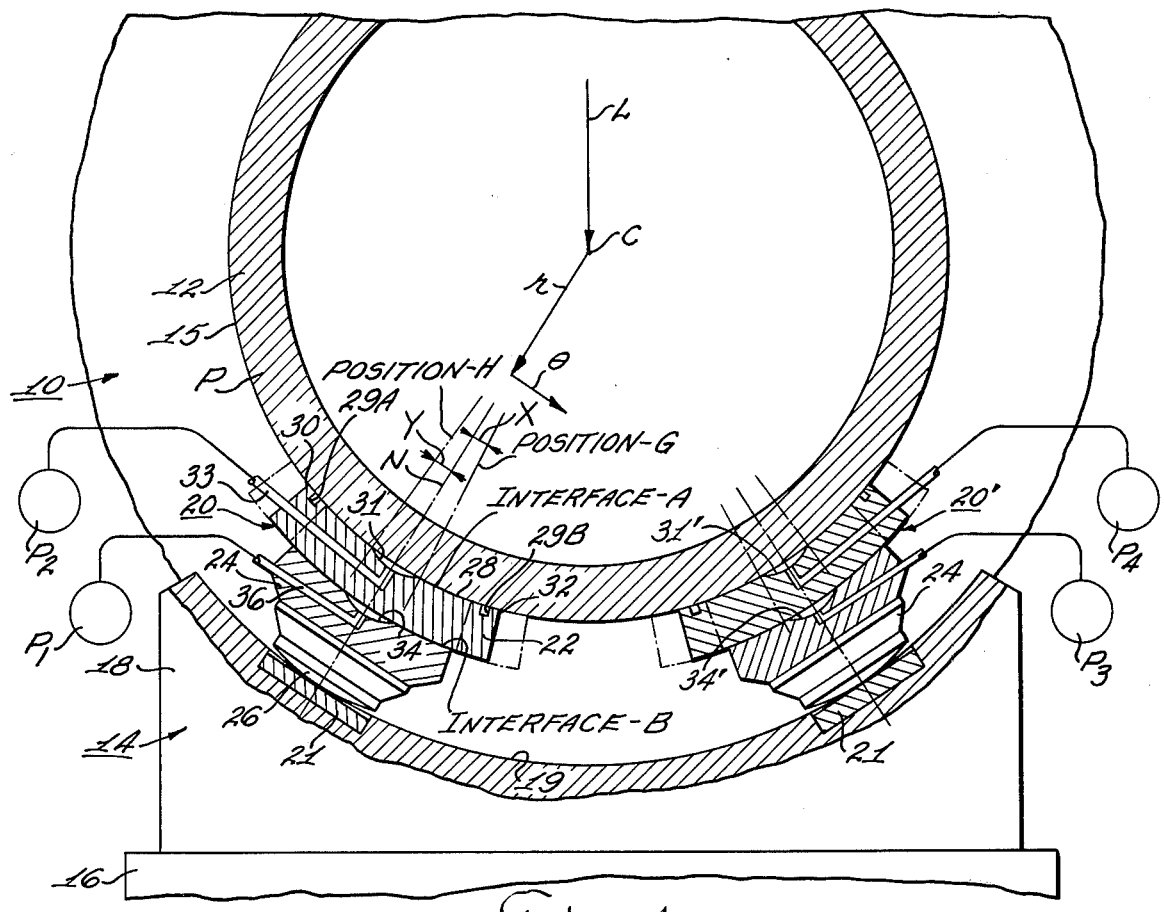
FIG. 1 is a view substantially along line I—I in FIG. 2 showing a grinding mill journalled for rotation in a bearing structure in accordance with the invention.
Figure 2:
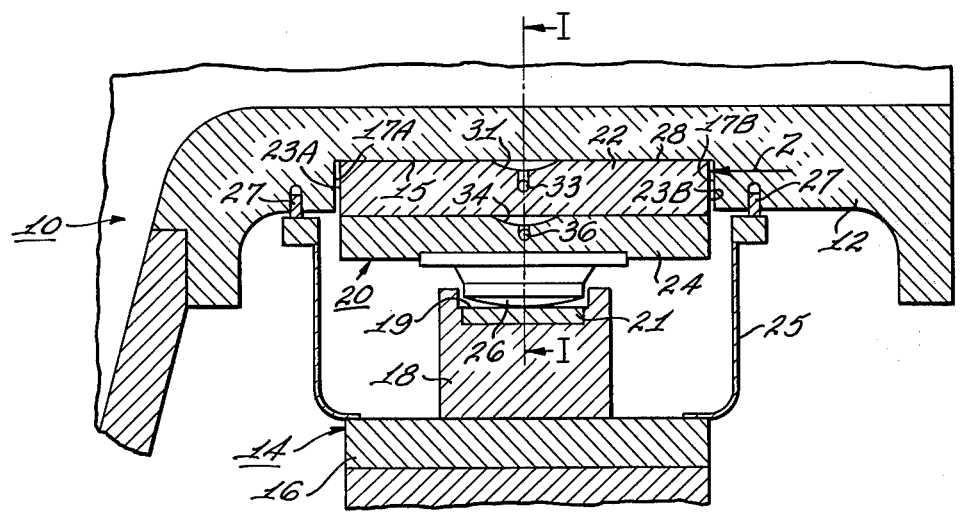
FIG. 2 is a view in axial section of the structure of FIG. 1.

Referring now to the drawings and more particularly to FIGS. 1 and 2, there is shown a rotary grinding mill generally indicated at 10 of the type used for grinding mineral ore or the like and having a hollow trunnion 12 which is journalled for rotation in a bearing structure generally indicated at 14. The trunnion 12 may be either the inlet trunnion or the discharge trunnion of the grinding mill. A bearing arrangement generally similar to that to be described herein is preferably provided at each of the opposite ends of the mill for supporting the respective inlet and discharge trunnions of the mill.

The bearing structure generally indicated at 14 comprises a normally vertical bearing pedestal 16 on the upper surface of which is suitably mounted an upwardly open bearing support 18. The upper surface 19 of bearing support 18 may be an arcuate portion of a cylinder whose radius is drawn substantially from the longitudinal axis C of trunnion 12. At circumferentially spaced intervals, surface 19 of bearing support 18 is recessed to receive inserts 21 of a suitable supporting material such as high grade hard tool steel for supporting the respective bearing pads 20 to be described. It will be noted that bearing support 18 only extends beneath the lower portion of the periphery of trunnion 12, the arcuate extent of bearing support 18 in the illustrated embodiment being less than 180°, as is common practice in the supporting arrangements for rotating trunnions of grinding mills. A suitable housing 25 is mounted on the upper end of bearing pedestal 16 in enclosing relation to the upper portion of the bearing structure to prevent contamination and loss of bearing lubricant. The upper end of housing 25 supports suitable seals 27 which engage the periphery of the rotating trunnion 12.

The journal bearing comprises a plurality of pivoted bearing pads (in the case of the illustrated embodiment, two) each respectively generally indicated at 20 which underlie the lower surface of trunnion 12 in supporting relation to the trunnion. Bearing pads 20 are spaced from each other a short distance circumferentially of trunnion 12. A minimum of two pivoted bearing pads 20 is required to support the rotating journal or trunnion 12 and generally more than two bearing pads are used (four, for example). While both bearing pads in FIG. 1 are identified by the general reference numeral 20, the bearing pad at the right in FIG. 1 is specifically identified by the reference numeral 20'. Each bearing pad 20 comprises a bearing pad portion 22 which extends circumferentially and axially of the trunnion 12 in underlying supporting relation to the trunnion. Each bearing pad 20 also includes a pivotal support portion 24 which may only extend for part of the circumferential length of pad portion 22 but which extends for the entire axial length of pad portion 22. Bearing pad portion 22 and pivotal support portion 24 are circumferentially adjustable relative to each other as will be described hereinafter. Pivotal support portion 24 is normally suitably secured to the radially outer portion of its corresponding bearing pad portion 22, as just mentioned, but is adjustably movable in a circumferential direction relative to bearing pad portion 22 when it is desired to adjust the location of the pivot point, as will be explained in more detail hereinafter.

The radially outer surface 26 of each pivotal support portion 24 is of spherical contour or of other suitable convex contour which permits the respective bearing pads 20 to undergo small rotations about at least two axes and preferably about all three axes indicated at $r$ (radial), $\theta$ (circumferential) and $z$ (axial) in FIGS. 1 and 2, as dictated by the oil film formed between the radially inner surface 28 of pad portion 22 and the radially outer cooperating surface 15 of the trunnion. The radially outer spherical or convex surface 26 of the pivotal support portion 24 of each respective bearing pad 20 is adapted to bear against one of the inserts 21 in arcuate surface 19 of bearing support 18.

The outer periphery of the journal or trunnion 12 is provided with an axially extending and circumferentially extending countersunk surface 15 which is adapted to radially overlie the bearing surface 28 of pad 20, and the countersunk surface 15 on the rotating journal 12 is bounded at the opposite axial ends thereof by thrust shoulders on journal 12, respectively indicated at 17A and 17B, which engage thrust shoulders 23A, 23B on bearing pads 20.

The oil pressure developed in the lubricating oil film at the interface between the radially inner bearing surface 28 of each respective bearing pad portion 22 and the radially outer surface 15 of trunnion 12 supports the load L and during normal running operation of the rotary grinding mill is due to hydrodynamic action of the lubricating fluid (due to relative rotation between surfaces 28 and 15), the low pressure oil for hydrodynamic lubrication being supplied at oil distribution grooves 29A and 29B as will be described in more detail hereinafter. Alternatively, the oil film pressure between the bearing and journal may be due to hydrostatic operation of lubricant supplied by a relatively high pressure external pump, only at certain times during the operation of the grinding mill, particularly during the start-up, inching, and shut-down operation of the grinding mill. High pressure oil for hydrostatic operation may be supplied through centrally located discharge opening 31 (FIG. 2) in bearing face 28 of the bearing pad 20. Discharge opening 31 is connected by suitable internal passages 33 in pad 20 to a source of high pressure oil, such as high pressure pump P-2.

The term leading edge is defined as that edge of the pivoted bearing pad 20 which is first passed by a given point P on the periphery of the rotating journal 12 for a given direction of rotation of the journal; while the term trailing edge is hereby defined as that edge of the pivoted bearing pad which is last reached by the given point P on the periphery of the rotating journal for the same direction of rotation of the journal. Thus, it will be seen in accordance with this definition that the point P on the periphery of trunnion 12 first reaches the edge 30 of the pivoted bearing pad 20 for counterclockwise direction of rotation of journal or trunnion 12 as viewed in FIG. 1 and hence, the term leading edge is applied to edge 30 relative to such counterclockwise rotation, while the edge 32 is last reached by the point P on the trunnion in the counterclockwise direction as viewed in FIG. 1; and hence, the term trailing edge is applied to the edge 32 of the pivoted bearing pad 20 relative to the counterclockwise rotation of journal 12 in FIG. 1.

If the direction of rotation of journal 12 is reversed, the relative location of the leading edge and trailing edge on the pivoted bearing pad 20 is reversed. If journal 12 is assumed to be rotating in a clockwise direction relative to FIG. 1, edge 32 of pivoted bearing pad 20 is the leading edge, while edge 30 is the trailing edge.

During normal running operation, a hydrodynamic oil film wedge develops between the bearing pad surface and the rotating journal with the oil film wedge extending inwardly from the leading edge of the bearing pad for the given direction of rotation. The formation of this hydrodynamic oil film wedge is facilitated by having the pivot point of the bearing pad offset a greater distance away from the leading edge for the given direction of rotation than from the trailing edge for the given direction of rotation.

During normal running operation, assuming counterclockwise rotation of trunnion 12 as viewed in FIG. 1, low pressure oil is normally supplied to the interface between surface 28 of bearing pad 20 and surface 15 of trunnion 12 through a discharge passage 29A (FIG. 1) in surface 28 of pad 20 near the leading edge 30 of pad 20 relative to the counterclockwise direction of rotation.

If the direction of rotation of trunnion 12 were clockwise relative to FIG. 1, low pressure oil would be supplied to the interface between surfaces 28 and 15 through discharge passage 29B near the leading edge 32 for clockwise rotation.

Discharge passages 29A and 29B are supplied by suitable internal passages (not shown) in bearing pad 20 which in turn are connected to a source of low pressure oil supply.

Referring now to the drawing, it will be noted that if the radially-extending centerline relative to the circumferential dimension of bearing pad portion 22 were to be in radial alignment with the radial line N shown in FIG. 1, then the bearing pad portion 22 would be symmetrically arranged circumferentially with respect to pivot support portion 24, in which case the pivot point of bearing pad 20 would not be offset relative to the center of the circumferential dimension of the bearing pad portion 22. This symmetrical relation of bearing pad portion 22 to pivotal support portion 24, just mentioned, is not used in accordance with the present invention, but instead the bearing pad is always operated with the pivot in an offset position. Thus, for clockwise rotation of journal 12, the bearing pad portion 22 lies with its circumferential center in position G (FIG. 1) so that the pivot point of bearing pad 20 is then circumferentially offset further from the then leading edge 32 of the bearing pad (for clockwise rotation of the journal) than from the then trailing edge 30 (for clockwise rotation).

Conversely, if journal 12 is rotating in a counterclockwise direction, in which case edge 30 is the leading edge and edge 32 is the trailing edge, then the bearing pad portion 22 is shifted relative to the pivotal support portion 24 in such manner that the center of the circumferential dimension of bearing pad portion 22 coincides with position H, in which case the pivoted point of the pivoted bearing pad is then circumferentially offset a greater distance from the then leading edge 30 (for counterclockwise rotation of journal 12) than from the then trailing edge 32 (for counterclockwise rotation).

The structure and method by which the shifting of the bearing pad portion 22 relative to the pivotal support portion 24 is accomplished to provide a circumferentially offset relationship of the pivot point relative to the circumferential center of bearing pad portion 22 will now be described.

It will be noted that a fluid discharge outlet opening 31 is centrally located in bearing face 28 of bearing pad portion 22 at the interface A between bearing pad portion 22 and journal 12. The fluid which is discharged through discharge opening 31 is normally a high pressure hydraulic fluid, and more particularly a high pressure oil flow. Hence, the high pressure fluid flow through discharge outlet 31 and through discharge outlet 34 (to be described) will be referred to as a high pressure oil flow.

The oil discharge outlet opening 31 is suitably connected to a high pressure oil pump P-2 by means of a conduit 33 which may comprise a fluid passage extending through the interior of bearing pad portion 22. This same discharge outlet 31 has been previously described as also being of use for hydrostatic operation during the initial startup, "inching," and shutdown operation of the grinding mill. The discharge outlet 31 is also used in connection with the pivot point shifting operation which is now being described.

It will also be noted that a second oil discharge outlet 34 opens into the radially inner surface of pivotal support portion 24 of bearing pad 20 at the interface B between pivotal support portion 24 and bearing pad portion 22. Oil discharge outlet opening 34 is connected by conduit means 36 which may comprise a fluid passage extending through the interior of pivotal support portion 24 and is thence connected to a different source of high pressure oil than the source to which outlet opening 31 is connected, since the oil discharged at outlet openings 31 and 34 may conceivably be at different pressures in the high pressure range. Thus, discharge outlet 34 at interface B is shown connected to high pressure oil pump P-1. The second discharge outlet 34 instead of being located in pivotal support portion 24 could instead be positioned in bearing pad portion 22 at the interface between bearing pad portion 22 and pivotal support portion 24.

The high pressure oil discharged at outlet opening 31 at interface A and also at outlet or discharge opening 34 at interface B may typically, for example, be in the range 500 pounds per square inch to 3500 pounds per square inch, although the pressures at these two discharge openings are not necessarily the same as each other. When a high pressure oil flow is admitted to interface A through discharge opening 31, as will be described hereinafter, it causes a radial jacking up of trunnion 12 relative to bearing pad portion 22 to facilitate relative circumferential adjusting movement of bearing pad portion 22 relative to trunnion 12. This radial jacking up may be of the order of magnitude of 0.002 – 0.005 inch, for example.

Similarly, when high pressure oil is discharged through outlet opening 34 at interface B, it causes a radial jacking up of bearing pad portion 22 relative to pivotal support portion 24 to facilitate relative circumferential adjusting movement of bearing pad portion 22 relative to pivotal support portion 24. This radial jacking up of bearing pad portion 22 relative to pivotal support portion 24 may also be of the order of magnitude of 0.002 – 0.005 inch, for example. When bearing pad portion 22 is jacked up relative to pivotal support portion 24, trunnion 12, of course, moves upwardly with bearing pad portion 22.

The surface 15 of journal 12 and the surface 28 of bearing pad 20 which define interfaces A lie on substantially concentric circumferential arcs. Similarly, the facing surfaces of bearing pad portion 22 and of pivotal support portion 24 at interface B lie on concentric circumferential arcs. In fact, the two surfaces at interface A and the two surfaces at interface B lie on circumferential arcs drawn substantially from a common center which lies substantially on the central longitudinal axis C of the rotatable trunnion or journal 12.

The second bearing pad specifically identified at 20' in FIG. 1 has discharge openings 31' and 34' which respectively correspond to discharge openings 31 and 34 hereinbefore described. The outlet openings 31' and 34' of bearing pad 20' are connected to separate high pressure pumps P-4 and P-3, respectively.

The structure just described in which the discharge outlet openings 31 and 34 are respectively provided (1) at the interface A between bearing pad portion 22 and journal 12, and (2) at the interface B between pivotal support portion 24 and bearing pad portion 22, permits the use of two different alternative methods of adjustment of the bearing pad pivot point, as follows:

METHOD 1

Assume that bearing pad portion 22 is at the position in which the center of its circumferential dimension is at position G in FIG. 1 (for clockwise rotation of journal 12) and that it is desired to shift the center of the circumferential dimension of bearing pad portion 22 to position H for counterclockwise rotation of journal 12.

It will be understood, of course, that normally once an adjustment of the pivot has been made, the pivot pad portion 22 and pivotal support portion 24 are secured together by suitable fastening means and remain in the adjusted position until it is decided to make a change in the adjusted position. Conversely, when it is desired to adjust the position of pivot pad portion 22 relative to pivotal support portion 24, the bolts or fastening means which secure members 22 and 24 in fixed position relative to each other are removed to permit relative movement of the members 22 and 24 with respect to each other.

To move bearing pad portion 22 to the position H from the position G as just stated, oil flow at high pressure is applied to the interface B between pivot pad portion 22 and pivotal support portion 24 through the discharge outlet opening 34. With high pressure lubricant flow between pivotal support portion 24 and bearing pad portion 22 to jack up bearing pad portion 22 relative to pivotal support portion 24, journal or trunnion 12 is then rotated clockwise for a circumferential distance equal to $X + Y$, which is the circumferential distance from position G to position H. The frictional force between trunnion 12 and bearing surface 28 of bearing pad portion 22 due to the weight of the mill will carry the bearing pad portion 22 with trunnion 12 through the clockwise direction $X \times Y$, as just mentioned, and when this arcuate distance has been moved, bearing pad portion 22 will then have the center of its circumferential dimension coinciding with position H. The parts 22 and 24 may then be secured together in fixed position relative to each other. When this adjustment has been made, as just described, the pivot point of pivotal support portion 24 will then be circumferentially offset a greater distance from edge 30 then from edge 32, which is the desired condition for counterclockwise rotation of journal 12 in which edge 30 is the leading edge.

It will be obvious that if it is desired to shift bearing pad portion 22 from position H back to position G for clockwise rotation of journal 12, similar steps to those just described will be followed with high pressure lubricant flow being supplied to the interface B between members 24 and 22 through discharge passage 34, and with trunnion 12 being rotated in a counterclockwise direction to move the circumferential center of pivot pad portion 22 from position H back to position G.

While the steps of method 1 have been described as being applied to one bearing pad 20, the same steps would normally be applied concurrently to all bearing pads 20. However, if it should be desired in method 1 to adjust only one bearing pad 20 at a time, this may be done if high pressure oil is admitted at interface A of the bearing pads 20 which are not being adjusted at the given moment. This permits adjustment of the bearing pads 20 to be made one at a time. All of the bearing pads 20 are adjusted to have the same offset pivot relation.

METHOD 2

With pivotal support portion 24 and pivot pad portion 22 unfastened and free to move relative to each other, the following steps are taken to readjust the pivot point for counterclockwise rotation of journal 12, assuming that the circumferential center of bearing pad portion 22 is already in position G for clockwise rotation of journal 12: (1) apply oil flow at high pressure to the interface B between pivotal support portion 24 and bearing pad portion 22 through the oil discharge opening 34 to jack up bearing pad portion 22 relative to pivotal support portion 24; (2) apply oil flow at high pressure to the interface A between bearing pad portion 22 and trunnion 12 through the oil discharge passage 31 at this interface to jack up trunnion 12 relative to bearing pad portion 22; (3) apply circumferential force to bearing pad portion 22 in a clockwise direction relative to FIG. 1 and move the bearing pad portion 22 through an arcuate distance equal to $X + Y$ whereby to move the circumferential center of bearing pad portion 22 from position G to position H; (4) secure the bearing pad portion 22 and the pivot support portion 24 to each other.

With the circumferential center of bearing pad portion in position H as just described, if it is desired to readjust the pivot point for clockwise rotation of journal 12, steps similar to those just described are followed, except that the circumferential force applied to the bearing pad portion 22 is applied to cause movement of bearing pad portion 22 in a counterclockwise direction relative to FIG. 1 to move the circumferential center of bearing pad portion 22 from position H to position G. Parts 22 and 24 are secured together when this adjustment has been made.

While the steps of method 2 have been described as being applied to one bearing pad 20, the same method is applied either concurrently to all bearing pads; or, alternatively, in method 2, the plurality of bearing pads may be adjusted one at a time. All of the bearing pads 20 are adjusted to have the same offset pivot relation.

During the adjustments described in methods 1 and 2 it has been assumed that pivot support portion 24 remains in a substantially fixed circumferential position, and that bearing pad portion 22 is moved circumferentially relative to member 24 whereby to adjust the position of the pivot point relative to the leading edge 30 or 32, as the case may be.

An important advantage of the bearing pad construction, apparatus, and method of the invention hereinbefore described is that the adjustment of the pivot point as just described by either of the methods 1 or 2 may be accomplished while the grinding mill or other journalled apparatus is loaded.

While the hydraulic fluid which has been described in the specification has been identified as oil and would normally be the same oil as that which is used to lubricate the bearing pads 20, the hydraulic fluid used for the purposes hereinbefore described need not necessarily be oil, but could be some other hydraulic fluid having a viscosity in the range of that of the oil used for lubricating bearing pads 20, sufficient to cause a jacking up of the surfaces at the interfaces A and B, as hereinbefore described.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A pivoted bearing pad adapted to be in supporting relation to a journal for bidirectional rotation of the journal, said bearing pad comprising a pad portion having a journal bearing surface, and a pivotal support portion adapted to support said bearing pad for pivotal movement on a stationary supporting surface, said pad portions and said pivotal support portion being secured to each other during normal operation of the journalled apparatus but being detachable from each other to permit circumferential adjustment of the circumferential location of said pivotal support portion relative to said pad portion, and means carried by said bearing pad admitting high pressure hydraulic fluid at the interface between said pad portion and said pivotal support portion whereby to facilitate relative circumferential adjusting movement between said pad portion and said pivotal support portion.

2. A pivoted bearing pad as defined in claim 1 in which said high pressure hydraulic fluid is in the pressure range of from approximately 500 pounds per square inch to approximately 3500 pounds per square inch.

3. A pivoted bearing pad as defined in claim 1 in which said high pressure hydraulic fluid causes a jacking up of said pad portion relative to pivotal support portion.

4. A pivoted bearing pad as defined in claim 1 which additionally includes means carried by said bearing pad for admitting high pressure hydraulic fluid at the interface between said pad portion and said journal, whereby to additionally facilitate relative circumferential adjusting movement between said pad portion and said pivotal support portion.

5. A pivoted bearing pad as defined in claim 4 in which said high pressure hydraulic fluid at the interface between said pad portion and said journal is in the pressure range of from approximately 500 pounds per square inch to approximately 3500 pounds per square inch.

6. A pivoted bearing pad as defined in claim 4 in which said high pressure hydraulic fluid at the interface between said pad portion and said journal causes a jacking up of said journal relative to said pad portion.

7. A method for circumferentially adjusting the location of the pivot point of a pivoted bearing pad in which said bearing pad comprises a pad portion having a journal bearing surface in supporting relation to a journal, and in which said bearing pad comprises a pivotal support portion adapted to support said bearing pad for pivotal movement on a stationary supporting surface, said pad portion and said pivotal support portion being secured to each other during normal operation of the journalled apparatus but being detachable from each other to permit circumferential adjustment of the circumferential location of said pivotal support portion relative to said pad portion, said method comprising the steps of:

1. Admitting a high pressure hydraulic flow to the interface between said pad portion and said pivotal support portion;
2. Concurrently with the admission of hydraulic flow as defined in step (1), rotating the journal through the desired circumferential arc of adjustment of said pivotal support portion relative to said pad portion, whereby the frictional force between the rotating journal and said pad portion will cause a corresponding arcuate movement of said pad portion with said rotating journal relative to said pivotal support portion; and
3. After completion of the desired circumferential adjusting movement, securing said pad portion and said pivotal support portion in fixed relation to each other.

8. The method defined in claim 7 in which said hydraulic flow is a lubricating fluid under high pressure.

9. The method defined in claim 7 in which said high pressure hydraulic flow is in the pressure range of from approximately 500 pounds per square inch to approximately 3500 pounds per square inch.

10. The method defined in claim 7 in which said high pressure hydraulic flow causes a jacking up of said pad portion relative to said pivotal support portion.

11. A method for circumferentially adjusting the location of the pivot point of a pivoted bearing pad in which said bearing pad comprises a pad portion having a journal bearing surface in supporting relation to a journal, and in which said bearing pad comprises a pivotal support portion adapted to support said bearing pad for pivotal movement on a stationary supporting surface, said pad portion and said pivotal support portion being secured to each other during normal operation of the journalled apparatus but being detachable from each other to permit circumferential adjustment of the circumferential location of said pivotal support portion relative to said pad portion, said method comprising the steps of:

1. Admitting a high pressure hydraulic flow to the interface between said pad portion and said journal;
2. Admitting a high pressure hydraulic flow to the interface between said pad portion and said pivotal support portion;
3. Concurrently with the admission of hydraulic flow to the interfaces as defined in steps (1) and (2), applying a circumferential force to said pad portion to move said pad portion through the desired circumferential arc of adjustment of said pivotal support portion relative to said pad portion;
4. After completion of the desired circumferential adjusting movement, securing said pad portion and said pivotal support portion in fixed relation to each other.

12. The method defined in claim 11 in which said hydraulic flow is a lubricating fluid under high pressure.

13. The method defined in claim 11 in which said high pressure hydraulic flow in each of the steps (1) and (2) is in the pressure range of from approximately 500 pounds per square inch to approximately 3500 pounds per square inch.

14. The method defined in claim 11 in which the high pressure hydraulic flow admitted to the interface between said pad portion and said journal causes a jacking up of said journal relative to said pad portion; and in which the high pressure hydraulic flow admitted to the interface between said pad portion and said pivotal support portion causes a jacking up of said pad portion relative to said pivotal support portion.

* * * * *